(12) United States Patent
Tomlinson et al.

(10) Patent No.: US 11,983,649 B2
(45) Date of Patent: May 14, 2024

(54) TARGETED TRAINING OF INDUCTIVE MULTI-ORGANIZATION RECOMMENDATION MODELS FOR ENTERPRISE APPLICATIONS

(71) Applicant: Microsoft Technology Licensing, LLC, Redmond, WA (US)

(72) Inventors: Kiran Tomlinson, Ithaca, NY (US); Longqi Yang, Issaquah, WA (US); Mengting Wan, Bellevue, WA (US); Cao Lu, Bellevue, WA (US); Brent Jaron Hecht, Redmond, WA (US); Jaime Teevan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 294 days.

(21) Appl. No.: 17/510,523

(22) Filed: Oct. 26, 2021

(65) Prior Publication Data

US 2023/0128832 A1    Apr. 27, 2023

(51) Int. Cl.
*G06Q 10/00* (2023.01)
*G06N 5/00* (2023.01)
(Continued)

(52) U.S. Cl.
CPC ........... *G06Q 10/063* (2013.01); *G06N 5/022* (2013.01); *G06N 5/04* (2013.01)

(58) Field of Classification Search
CPC .......................................... G06Q 10/00–50/00
(Continued)

(56) References Cited

U.S. PATENT DOCUMENTS 7,788,123 B1    8/2010  Ekhaus et al.
8,103,611 B2    1/2012  Tuzhilin et al.
(Continued)

OTHER PUBLICATIONS

"International Search Report and Written Opinion Issued in PCT Application No. PCT/US22/040524", dated Nov. 16, 2022, 11 Pages.
(Continued)

*Primary Examiner* — Mustafa Iqbal
(74) *Attorney, Agent, or Firm* — Foley IP Law, PLLC

(57) ABSTRACT

An enterprise system server, a computer-readable storage medium, and a method for targeted training of inductive multi-organization recommendation models for enterprise applications are described herein. The method includes receiving enterprise application data from remote organization computing systems executing the enterprise application, training per-organization recommendation models for a subset of the organizations, and validating each per-organization recommendation model on enterprise application data corresponding to one or more other organizations. The method also includes calculating a transferability metric for each per-organization recommendation model based on results obtained during validation, determining a specified number of organizations including the best-transferring per-organization recommendation models based on the calculated transferability metrics, and training an inductive multi-organization recommendation model using the enterprise application data from the specified number of organizations. The method further includes utilizing the trained inductive multi-organization recommendation model to provide user recommendations to the remote organization computing systems during execution of the enterprise application.

20 Claims, 5 Drawing Sheets

(51) Int. Cl.
*G06N 5/022* (2023.01)
*G06N 5/04* (2023.01)
*G06Q 10/063* (2023.01)

(58) Field of Classification Search
USPC ........................................................ 705/7.11
See application file for complete search history.

(56) References Cited

U.S. PATENT DOCUMENTS

| | | | |
|---|---|---|---|
| 8,682,918 B2 | 3/2014 | Ramanujam | |
| 8,984,000 B2 | 3/2015 | Tuzhilin et al. | |
| 9,607,090 B2 | 3/2017 | Palmert et al. | |
| 9,992,211 B1 | 6/2018 | Viljoen et al. | |
| 10,572,820 B2 | 2/2020 | Jagota et al. | |
| 2012/0143641 A1* | 6/2012 | O'Brien | G06Q 30/02 |
| | | | 705/7.11 |
| 2013/0290048 A1* | 10/2013 | Bradley | G06Q 10/063 |
| | | | 705/7.11 |
| 2018/0357587 A1 | 12/2018 | Bogaert et al. | |
| 2019/0012167 A1* | 1/2019 | Boss | G06Q 50/01 |
| 2019/0303838 A1* | 10/2019 | Chung | G06F 16/908 |
| 2020/0057976 A1 | 2/2020 | Prakash et al. | |
| 2020/0065342 A1 | 2/2020 | Panuganty | |
| 2021/0133239 A1 | 5/2021 | Brochu et al. | |
| 2021/0248136 A1 | 8/2021 | Panuganty et al. | |
| 2021/0326528 A1 | 10/2021 | Kemp et al. | |
| 2022/0129804 A1* | 4/2022 | Dooley | G06Q 10/0635 |
| 2023/0267323 A1* | 8/2023 | Agarwal | G06Q 10/06393 |
| | | | 706/18 |

OTHER PUBLICATIONS

"Amazon Personalize", Retrieved from: https://aws.amazon.com/personalize/, Aug. 20, 2021, 11 Pages.

Florescu, et al., "Resilient Backpropagation (Rprop) for Batch-Learning in Tensorflow", In ICLR Workshop Submission, Feb. 12, 2018, 5 Pages.

Naumov, et al., "DLRM: An Advanced, Open Source Deep Learning Recommendation Model", Retrieved from: https://ai.facebook.com/blog/dlrm-an-advanced-open-source-deep-learning-recommendationmodel/, Jul. 2, 2019, 6 pages.

Shao, Qihong, "Towards Effective and Intelligent Multi-Tenancy SaaS", In a Dissertation Presented in Partial Fulfillment of the Requirements for the Degree Doctor of Philosophy, May 2011, 303 Pages.

* cited by examiner

TARGETED TRAINING OF INDUCTIVE MULTI-ORGANIZATION RECOMMENDATION MODELS FOR ENTERPRISE APPLICATIONS

BACKGROUND

The present disclosure relates to machine learning. In particular, the present disclosure relates to the targeted training of inductive multi-organization recommendation models for enterprise applications.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for targeted training of an inductive multi-organization recommendation model for an enterprise applications is described. The method is implemented in a computing system including a processor. The method includes receiving, via a network, enterprise application data from remote organization computing systems executing the enterprise application, where each remote organization computing system corresponds to an organization that subscribes to the enterprise application, as well as training, via the processor, a per-organization recommendation model for each of a subset of the organizations that subscribe to the enterprise application using at least a portion of the enterprise application data received from the corresponding remote organization computing systems. The method also includes validating each per-organization recommendation model on at least a portion of the enterprise application data corresponding to at least one other organization, calculating a transferability metric for each per-organization recommendation model based on results obtained during the validation of the per-organization recommendation model, and determining a specified number of organizations including the best-transferring per-organization recommendation models based on the calculated transferability metrics. The method further includes training an inductive multi-organization recommendation model using at least a portion of the enterprise application data from the specified number of organizations including the best-transferring per-organization recommendation models, as well as utilizing the trained inductive multi-organization recommendation model to provide, via the network, user recommendations to the remote organization computing systems during execution of the enterprise application.

In another embodiment, a computer-readable storage medium is described. The computer-readable storage medium includes computer-executable instructions that, when executed by a processor, cause the processor to receive enterprise application data from remote organization computing systems executing the enterprise application, where each remote organization computing system corresponds to an organization that subscribes to the enterprise application, and to train a per-organization recommendation model for each of a subset of the organizations that subscribe to the enterprise application using at least a portion of the enterprise application data received from the corresponding remote organization computing systems. The computer-executable instructions, when executed by the processor, cause the processor to validate each per-organization recommendation model on at least a portion of the enterprise application data corresponding to at least one other organization, to calculate a transferability metric for each per-organization recommendation model based on results obtained during the validation of the per-organization recommendation model, and to determine a specified number of organizations including the best-transferring per-organization recommendation models based on the calculated transferability metric. The computer-executable instructions, when executed by the processor, further cause the processor to train an inductive multi-organization recommendation model using at least a portion of the enterprise application data from the specified number of organizations including the best-transferring per-organization recommendation models, as well as to utilize the trained inductive multi-organization recommendation model to provide, via the network, user recommendations to the remote organization computing systems during execution of the enterprise application.

In another embodiment, an enterprise system server is described. The enterprise system server includes a processor, an enterprise application, and a communication connection for connecting remote organization computing systems to the enterprise system server through a network, where each remote organization computing system corresponds to an organization that subscribes to the enterprise application. The enterprise system server also includes a database for storing enterprise application data received from the remote organization computing systems during execution of the enterprise application and a computer-readable storage medium operatively coupled to the processor. The computer-readable storage medium includes computer-executable instructions that, when executed by the processor, cause the processor to train a per-organization recommendation model for each of a subset of the organizations that subscribe to the enterprise application using at least a portion of the enterprise application data received from the corresponding remote organization computing systems, to validate each per-organization recommendation model on at least a portion of the enterprise application data corresponding to at least one other organization, and to calculate a transferability metric for each per-organization recommendation model based on results obtained during the validation of the per-organization recommendation model. The computer-readable storage medium also includes computer-executable instructions that, when executed by the processor, cause the processor to determine a specified number of organizations including the best-transferring per-organization recommendation models based on the calculated transferability metrics, to train an inductive multi-organization recommendation model using at least a portion of the enterprise application data from the specified number of organizations including the best-transferring per-organization recommendation models, and to utilize the trained inductive multi-organization recommendation model to provide, via the network, user recommendations to the remote organization computing systems during execution of the enterprise application.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents.

Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
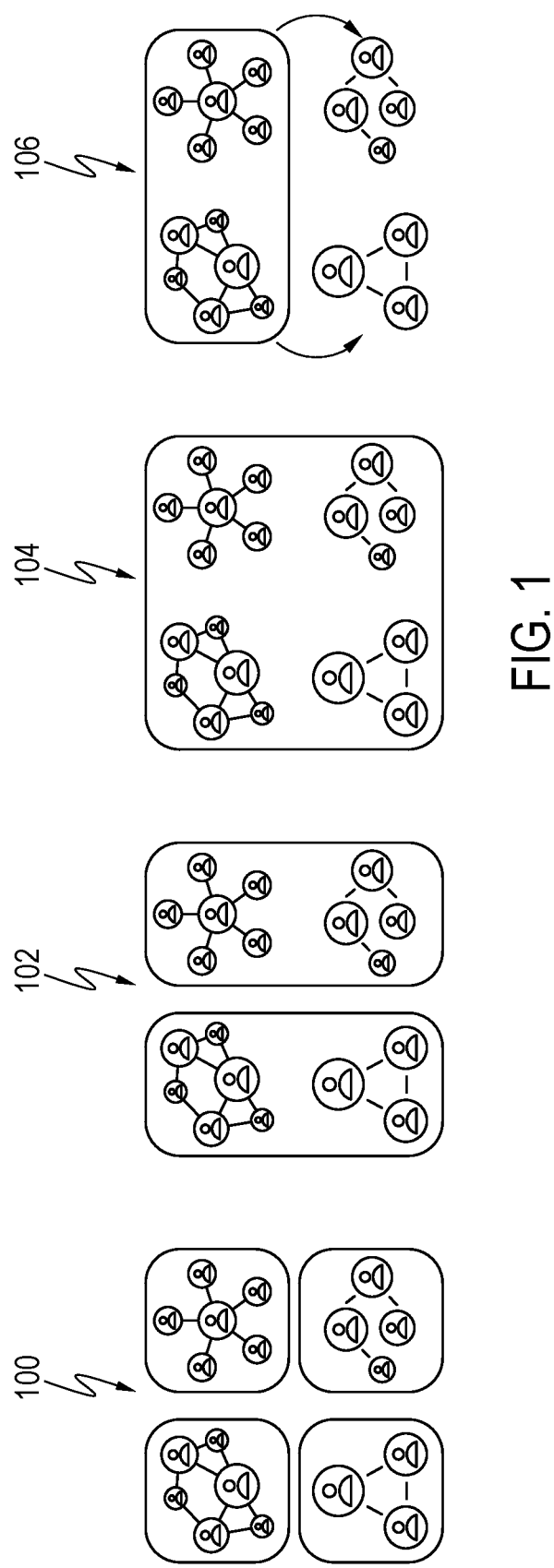
FIG. 1 is a schematic view depicting several options for training inductive recommendation models across multiple organizations.

In today's increasingly-computerized environment, organizations have shifted their focus to providing computational support for the operational and computational needs of the organization as a whole, rather than focusing on the needs of individual users within the organization. As a result, enterprise applications have been developed to meet such demands, where the term "enterprise application" refers to large-scale web-based applications including software, sometimes referred to as "enterprise application software (EAS)," that is intended to support the operational and computational needs of various different organizations, i.e., "enterprises." Exemplary types of organizations that utilize such enterprise applications include large industries, governments, retailers, hospitals, and departments or organizations directed to sales, marketing, customer service, project management, financing, and the like.

Simultaneously with the development of enterprise applications, application service providers have become more focused on developing recommender systems that are capable of enhancing the user experience by offering suggestions or recommendations that are likely to be of interest to each user. As an example, many applications are capable of providing different types of user recommendations, such as recommendations in the form of search results that are ranked according to the likely relevance to each user, lists of suggested contacts for each user, and/or lists of suggested posts that are likely to be of interest to each user. However, because such recommender systems require accurate machine learning models that are capable of predicting relevant recommendations, the integration of such recommender systems into enterprise applications has proven to be increasingly difficult as the number and diversity of the organizations using such enterprise applications increases. In particular, enterprise application service providers often need to make recommendations across multiple, non-overlapping organizations. For example, each organization that subscribes to enterprise applications such as Microsoft Teams or Slack has its own set of users and posts, forming an independent communication network in which recommendations over relevant posts or users should be made. However, the disjoint nature of these organizations makes it challenging for traditional recommender systems to take advantage of cross-organization patterns. Moreover, it is vital that recommender systems obey the strict privacy boundaries between organizations. Making recommendations in this setting is further complicated by the fact that new items, users, and even organizations are continuously joining, requiring a fully-inductive approach that is capable of using inductive inference techniques to form generalized rules from observed training data, which can then be applied to new test data. The presence of multiple organizations, combined with the need for inductive methods, renders the integration of recommender systems into enterprise applications particularly challenging.

Many approaches to recommender systems have focused on collaborative filtering methods (e.g., often using user and item embeddings), which are ill-suited for integration into multi-organization recommender systems since such collaborative filtering methods cannot naturally take advantage of cross-organization patterns without overlapping users or items. Moreover, collaborative filtering methods are transductive, meaning that, in contrast to inductive methods, such methods rely on specific test data and do not produce generalized rules that can be easily applied to new data. This, in turn, prevents such methods from being effectively applied to new organizations that join a service.

Another key feature of the multi-organization recommendation setting is the possibility of heterogeneity in user behavior among organizations. In the past, cross-domain recommendation techniques have been developed to combine data from multiple heterogeneous sources to improve the performance of recommender systems. For instance, user preferences over movies might inform book recommendations. However, the notion of "domain" is distinct from that of "organization." In particular, the items and tasks in different organizations are generally of the same type or sort, whereas the items and tasks in different domains are generally not of the same type or sort. Additionally, almost all research in cross-domain recommendation has focused either on the single-target case, where information from one domain is leveraged to provide improved recommendations in a target domain, or the dual-target case, where better recommendations are made across two domains by jointly leveraging their relationships. Furthermore, such cross-domain recommendation techniques often rely on user overlap between the domains or some other way of linking domains, such as cross-domain social networks or assuming similar user-item clustering in the source and target domains. As a result, cross-domain recommendation techniques are generally not suitable for extension to the problem of multi-organization recommendation.

Some prior work does address the non-overlapping multi-domain setting, including multi-domain collaborative filtering and multi-domain active learning, which could be applied to multi-organization recommendation. However, such approaches are fundamentally transductive. As a result, such approaches are not suitable for use with respect to enterprise applications, which are continuously expanded to add new items, users, organization, and the like.

Another challenge that makes multi-organization recommendation difficult is the need for privacy between organizations. In particular, it is vital that the enterprise application data do not leak between organizations. As a result, content-based features generally cannot be used to create recommender systems for enterprise applications. This restriction limits the applicability of many existing methods (such as, in particular, neural methods) that rely on the utilization of content-based features to provide improved recommendations. Accordingly, these is a need for improved multi-organization recommendation methods that are capable of addressing the challenges and restrictions described above.

Several model training solutions could be used to attempt to address this issue, such as, in particular, the following three solutions: (1) training an inductive recommendation model using the global enterprise application data collected from all organizations that utilize the enterprise application; (2) training a separate inductive recommendation model for each organization using separate enterprise application data collected from each organization that utilizes the enterprise application; or (3) clustering the organizations that utilize the enterprise application and training a separate inductive recommendation model for each cluster using enterprise application data collected from the organizations within each cluster. However, each of these approaches has been tested and has been found to be suboptimal in several respects, including in terms of accuracy, model management cost, training cost, and/or robustness. Therefore, such model training solutions are not sufficient to fully address the challenges and restrictions related to providing recommendation models that can be used across various organizations using enterprise applications.

The present techniques solve this issue by providing for the targeted training of inductive multi-organization recommendation models for enterprise applications. More specifically, the present techniques provide for the targeted training of a novel type of recommendation machine learning model (referred to herein as an "inductive multi-organization recommendation model"), which is trained to provide user recommendations within the context of an enterprise application that is utilized across multiple organizations. This novel approach has been demonstrated to outperform the three model training solutions described above in terms of accuracy, model management cost, training cost, and robustness.

According to embodiments described herein, such targeted training is accomplished by training a per-organization recommendation model for each organization within a sampled subset of the relevant organizations and then evaluating the performance of the per-organization recommendation models when transferred and applied to the other organizations. Next, a specified number, k, of the best-transferring per-organization recommendation models (i.e., the "top-k" best-transferring per-organization recommendation models) is selected, and a final inductive multi-organization recommendation model is then trained using data from the organizations corresponding to the top-k best-transferring recommendation models (or by aggregating the top-k best-transferring recommendation models into a single, final model).

In experiments across multiples tasks and using multiple predictive models, this approach has been found to result in more robust and higher-accuracy recommendation models than existing techniques. In particular, training per-organization recommendation models and then selecting specific organizations to be used to train the final model based on the validation performance of such per-organization models allows for the identification of the most relevant data for final model training. This, in turn, allows noisy and/or irrelevant data from the non-selected organizations to be discarded, thus preventing such data from negatively impacting model training and resulting in worse performance for the final model. This is in contrast to conventional machine learning techniques, for which it is generally considered that more data is better. As such, the conventional multi-domain machine learning approach is to train models on the global data from all the domains (or on a random subset of data from all the domains). In contrast, the present techniques provide a novel approach in which only the organizations (e.g., domains) including data that result in the most robust models (as predicted by cross-organization testing on a validation dataset) are used for training, while the rest are discarded. This novel approach has resulted in unexpected results. Specifically, training the final model using data from a targeted subset of the organizations, rather than data from all the organizations, actually increases the performance of the resulting recommendation model across all organizations, including the organizations that were not selected for training.

According to embodiments described herein, the final inductive multi-organization recommendation model is used to improve both user experience and user productivity with respect to a corresponding enterprise application. This is achieved by providing the user with more relevant recommendations during execution of the corresponding enterprise application. As examples, the inductive multi-organization recommendation model can provide the user with more relevant search results, suggested posts, and/or suggested contacts, regardless of the particular organization with which the user is associated. As more specific examples, the inductive multi-organization recommendation model can provide more relevant email search results and/or recipient suggestions when utilized in conjunction with Microsoft Outlook, more relevant activity feed suggestions when utilized in conjunction with Microsoft Teams, and/or more relevant document suggestions when utilized in conjunction with Microsoft SharePoint. Moreover, those skilled in the art will appreciate that the techniques described herein can also be applied to any other types of enterprise applications that include search, recommendation, and/or suggestion features.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage medium (or media)" refers specifically to non-transitory forms of computer-readable storage media and expressly excludes carrier waves and/or propagated signals.

Challenges of Multi-Organization Recommendation Problem and Advantages of Inductive Multi-Organization Recommendation Techniques Described Herein A multi-organization recommendation problem consists of a collection of n organizations labeled 1, . . . , n, each of which has a set of users $U_i$ and a set of items $I_i$ over which user recommendations are to be made. Note that, in the case of user-user recommendations (e.g., "people you may know"), $I_i = U_i$. The organizations are disjoint, i.e., for any $i \neq j$, $U_i \cap U_j = I_i \cap I_j = \emptyset$. In each organization i, the goal is to identify items in $I_L$ to recommend to each user in $U_L$ (for instance, this may take the form of a personalized ranking). This is accomplished by utilizing the information collected from the organizations.

Multi-organization recommendation involves a unique combination of challenges, which may be described as six factors. Two of these factors, which are referred to herein as "disjointness" and "privacy boundaries," are inherent to any multi-organization recommendation setting. The other four factors, which are referred to herein as "cold starts," "data heterogeneity," "behavioral heterogeneity," and "resource constraints," have varying ramifications depending on the particular multi-organization recommendation problem. Each factor is described in more detail below.

The first factor is disjointness. The key characteristic distinguishing multi-organization recommendation from cross-domain recommendation is the lack of overlap between users or items. Because of this disjointness, data from multiple organizations must be combined based on more general patterns than those used in the typical collaborative filtering case. Disjointness is one of the features that motivates the use of inductive models, which do not learn parameters associated with any particular user or item. As a result, an inductive model trained on one organization's data can be easily applied to another organization's data.

The second factor is privacy boundaries. In multi-organization recommendation, it is crucial to respect the privacy boundaries between organizations. Specifically, no organization should be able to gain information about any other organization based on the recommendations provided by the multi-organization recommendation model. In order to safeguard privacy, the present techniques do not utilize any content-based features, relying instead on temporal- and/or network-based features, such as, for example, how long it has been since a message was posted or how many people have replied to a message.

The third factor is cold starts. In real-world multi-organization platforms, new organizations are continuously joining. Therefore, models need to quickly adapt to make recommendations in these new settings. Moreover, new users and items frequently appear within each organization. In some cases (such as in post recommendation), the items may be transient, requiring recommendations for items without much knowledge of previous user actions. All of these factors make inductive models a necessity for real-world multi-organization recommender systems. The frequency with which new organizations join might also affect how much per-organization personalization is feasible.

The fourth factor is data heterogeneity. Organizations can vary significantly in size and structure, from small startups with a dozen employees to multi-national corporations with tens of thousands of employees in a complex hierarchy. This results in significant variations in the quantity of data available from each organization. A high-quality multi-organization method should be able to make recommendations for organizations at both ends of this spectrum. Moreover, in addition to differences in data quantity, differences in data quality should be considered, as some organizations have higher-quality data on which performant models are more easily trained. Data differences also manifest as differences in the difficulty of the recommendation task for a particular organization.

The fifth factor is behavioral heterogeneity. In addition to distinctions in data quantity and quality, different organizations may also vary in user behavior. Some types of items (e.g., recent messages) may be more valued at some organizations than others. If this is the case, the best model for one organization may be different than the best model for another organization. If present, behavioral heterogeneity has a strong effect on the viable strategies for multi-organization recommendation. The degree of behavioral heterogeneity depends on the recommendation task and the collection of organizations.

The sixth factor is resource constraints. A key practical consideration, especially when there are hundreds of thousands of organizations, is the quantity of resources (e.g., time, space, and/or hours of labor) required to train and maintain multi-organization recommendation models. In terms of training, it is helpful if not all organizations need to be considered at training time (i.e., if it is sufficient to consider only a subset of the organizations), although this depends on the degree of data heterogeneity and behavioral heterogeneity in a particular setting.

Turning now to solutions to the multi-organization recommendation problem, several possible approaches for training multi-organization recommendation models are summarized herein. These model training approaches include the following: (1) training per-organization models; (2) training clustered models; and (3) training a global model. These approaches are then compared and contrasted to the novel model training approach described herein, which includes targeted training of an inductive multi-organization recommendation model using data from a subset of the available organizations. These approaches are illustrated in FIG. 1, which is a schematic view depicting several options for training inductive recommendation models across multiple organizations. Specifically, per-organization model training is depicted schematically at 100 and includes training a separate recommendation model for each organization using the data from the corresponding organization. Clustered model training is depicted schematically at 102 and includes clustering the organizations and then the training a recommendation model for each cluster using data obtained from the organizations within the respective cluster. Global model training is depicted schematically at 104 and includes training a single recommendation model using data from all the organizations (or a random subset of the data from the all the organizations). Finally, the inductive multi-organization recommendation techniques described herein are depicted schematically at 106 and include determining a subset of the organizations with the best training data and performing targeted training of the final model using data from that subset. Notably, these model training approaches are all model-agnostic, meaning that they can be applied to any suitable type of inductive recommendation model, such as, for example, graph neural network models. Moreover, as described further below, the inductive multi-organization recommendation techniques described herein generally provide the best performance in terms of the four instance-specific challenges described above, i.e., cold starts, data heterogeneity, behavioral heterogeneity, and resource constraints.

Turning now to a more-detailed explanation of each of the model training approaches summarized above, per-organization model training involves maintaining a separate model for each organization, with each model trained on data from the organization to which it is applied. This approach is beneficial if there is significant heterogeneity in user behavior among organizations. However, this approach requires each organization to have sufficient high-quality data for training. Additionally, per-organization model training requires maintaining many sets of separate parameters, which is prohibitively unwieldy for very large-scale enterprise applications, such as Microsoft Teams, for which there may be more than half a million subscribing organizations. Additionally, per-organization model training poses a significant issue in terms of cold-start prediction for new organizations since it requires the collection of enough data from the new organization to train a new model. On the other hand, per-organization models inherently obey privacy boundaries.

To avoid the cost of maintaining many separate models, one natural approach is to perform global model training on combined data from all the organizations (or a random subsample of such data if resource constraints demand it). This is also the default approach if one ignores the fact that organizational structure is present in a recommendation task. Global model training has some advantages. In particular, global model training utilizes the maximum possible amount of data, is very simple, and produces a single model. However, global model training also has several drawbacks, such as the fact that it ignores any heterogeneity in user behavior. More subtly, it also overlooks variations in data quality, which can result in the inclusion of data that significantly degrade the quality of the resulting model. Moreover, on the privacy front, care needs to be taken not to include content in the models that could leak between organizations.

A middle ground between per-organization and global modeling training is clustering, where a single model is trained for each cluster of organizations. This shares the advantages of both approaches, combining data from multiple sources while also parsimoniously accounting for heterogeneity. Clustering can be performed based on organization features if they are available. However, to maximize generality, embodiments described herein assume that no such features are available (beyond basic measures such as user/item count). Instead, organizations are clustered based on the transfer performance of their per-organization models. Spectral co-clustering on the matrix of cross-organization validation mean average precisions (MAPs) is used to identify clusters of source organizations whose models transfer with high MAP to clusters of target organizations. Models trained on the source clusters are then applied to the target clusters.

While conventional wisdom holds that more training data is better, embodiments described herein demonstrate that this is not necessarily the case for multi-organization recommendation tasks. In particular, excluding some organizations entirely from training can significantly boost recommendation performance, even on the excluded organizations. According to embodiments described herein, a small subset of organizations on which high-quality models can be trained is identified. Then only those organizations are used for training a single final model, which can be applied globally to all the organizations. To perform the initial organization selection, per-organization models are trained, and each model's cross-organization transfer performance on one or more validation datasets is then measured. In various embodiments, the mean average precision (MAP) is used as the metric for measuring the cross-organization transfer performance. However, any other suitable metric could alternatively be used. The source organizations with the highest mean performance over all the target organizations are then selected, and the selected organizations are used to train the final model. Exemplary pseudocode for this process is shown below in Algorithm 1.

Algorithm 1: Targeted Training of Inductive
Multi-Organization Recommendation Model 1: Input: training and validation data for n oganizations,k, p
2: D ← a p-fraction subsample of the organizations
3: for organization d in D do
4:     train model $M_d$ on d' validation data
5:     for organization d' in D do
6:         evaluate $M_d$ on d' validation data
7:     $\bar{t}(d)$ ← mean performance of $M_d$ from line 6
8: D* ← k organizations d with highest $\bar{t}(d)$
9: return model trained on combined data from D*

The inductive multi-organization recommendation techniques described herein provide the best results when user behavior is substantially homogeneous across organizations, but there is heterogeneity in data noise. Additionally, since the techniques described herein result in one final model, such techniques advantageously result in low maintenance costs. However, there is an added computational cost to the initial organization selection phase. This computational cost can be reduced if the fraction of high-data-quality organizations is sufficiently high that a small subset of the organizations contains good training candidates, which is likely to be the case for most multi-organization recommendation tasks relating to enterprise applications. Furthermore, the present techniques provide for the exclusion of content-based features to preserve privacy boundaries between organizations.

Exemplary implementations of the embodiments described herein have shown that relative model performance is highly consistent across organizations. In other words, a model that performs well for one organization utilizing an enterprise application will tend to perform well across all organizations utilizing the enterprise application. This empirical finding indicates that many user behaviors, including, for example, file access patterns, personal messages, message replies, and message reactions, are very similar across organizations. In addition to being an interesting behavioral finding, this also has beneficial practical implications. In particular, such behavioral homogeneity means that model selection only needs to be performed on a small subset of all organizations, which is a considerable efficiency benefit. By exploiting this behavioral consistency and identifying data on which models are easily trained, the present techniques provide inductive multi-organization recommendation models that perform very well compared to those provided by other approaches.

Figure 2:
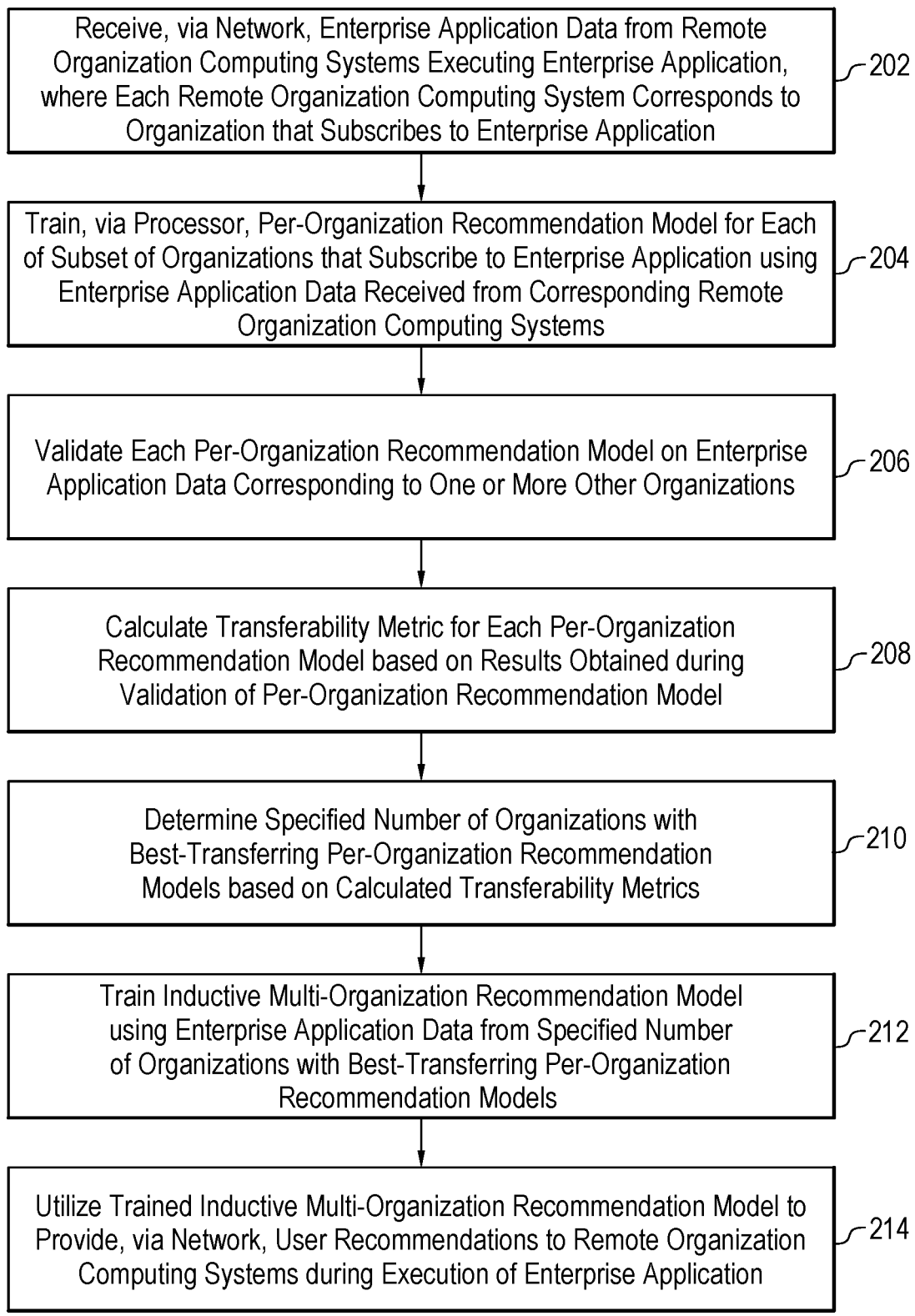
FIG. 2 is a process flow diagram of a method for the targeted training of inductive multi-organization recommendation models for enterprise applications according to embodiments described herein.

Exemplary Method for Targeted Training of Inductive Multi-Organization Recommendation Models for Enterprise Applications FIG. 2 is a process flow diagram of a method 200 for the targeted training of inductive multi-organization recommendation models for enterprise applications according to embodiments described herein. The method 200 is executed via a computing system, such as the computing system described with respect to FIG. 3. The computing system includes one or more processors and one or more computer-readable storage media including computer-executable instructions that, when executed by the processor(s), cause the processor(s) to perform the blocks of the method 200. In addition, in various embodiments, the method 200 is executed within the context of a network environment including one or more enterprise system server(s) and multiple organization computing systems, as described further with respect to the exemplary network environment of FIG. 4.

The method 200 begins at block 202, at which enterprise application data are received, via a network, from remote organization computing systems executing the enterprise application, where each remote organization computing system corresponds to an organization that subscribes to the enterprise application. Those skilled in the art will appreciate that the type of enterprise application data that is received at block 202 is dependent on the type of enterprise application being executed by the remote organization computing systems. As a non-limiting example, in some embodiments, the enterprise application is a communication/collaboration application, and the enterprise application data include user-user data and/or user-item data.

At block 204, a per-organization recommendation model is trained for each of a subset of the organizations that subscribe to the enterprise application using at least a portion of the enterprise application data received from the corresponding remote organization computing systems. In various embodiments, the subset of organizations for which to train the per-organization recommendation models is randomly selected. In other embodiments, any suitable type of evaluation criteria may be applied to the enterprise data corresponding to the organizations, and the organizations with the most relevant enterprise data may be selected. For example, in some embodiments, applying the evaluation criteria may include performing one or more preprocessing steps that are designed to identify enterprise data that are not highly relevant to the goal of the specific multi-organization recommendation task.

In various embodiments, the per-organization recommendation models are trained using network topology features and/or temporal features but excluding content-based features (to protect the privacy of each organization's enterprise application data). Furthermore, in various embodiments, the per-organization recommendation models include logistic regression models, graph convolutional network (GCN) models, or inductive graph-based matrix completion (IGMC) models, or some combination thereof. However, those skilled in the art will appreciate that any other suitable type of neural-network-based recommendation model may be utilized, depending on the details of the particular implementation.

At block 206, each per-organization recommendation model is validated on at least a portion of the enterprise application data corresponding to at least one other organization. In other words, cross-organization validation is performed for each per-organization recommendation model using a validation dataset that includes enterprise application data corresponding to one or more organizations other than the organization corresponding to the per-organization recommendation model.

At block 208, a transferability metric is calculated for each per-organization recommendation model based on results obtained during the validation of the per-organization recommendation model. In various embodiments, this includes calculating a ranking metric for the results obtained during the validation of each per-organization recommendation model. In such embodiments, the ranking metric may include a mean average precision (MAP) of such results. However, those skilled in the art will appreciate that any suitable transferability or performance metric may be used to evaluate the transfer performance of the per-organization recommendation models, depending on the details of the specific implementation.

At block 210, a specified number of organizations corresponding to the best-transferring per-organization recommendation models is determined based on the calculated transferability metrics. In various embodiments, this includes determining a specified number, k, of the organizations corresponding to the top-k best-transferring per-organization recommendation models. As an example, in some embodiments, the specified number of organizations includes the five organizations corresponding to the top-five best-transferring per-organization recommendation models.

At block 212, an inductive multi-organization recommendation model is trained using at least a portion of the enterprise application data from the specified number of organizations corresponding to the best-transferring per-organization recommendation models. In other words, the inductive multi-organization recommendation model is trained using a combination of enterprise application data obtained from the organizations associated with the top-k best-transferring per-organization recommendation models. In some embodiments, this includes disregarding the already-trained best-transferring per-organization recommendation models and training a new inductive multi-organization recommendation model using only the enterprise application data from the specified number of organizations corresponding to the best-transferring per-organization recommendation models. In other embodiments, this includes aggregating the already-trained best-transferring per-organization recommendation models in any suitable manner to obtain the inductive multi-organization recommendation model. In other words, the final inductive multi-organization recommendation model may be trained by, for example, starting from scratch and using the data from the specified number of organizations, or it may be trained by, for example, aggregating the already-trained models corresponding to such organizations according to any suitable model aggregation technique. However, in practice, the specific manner in which the final model is trained will depend on the details of the particular implementation.

In various embodiments, the inductive multi-organization recommendation model is trained using network topology features and/or temporal features but excluding content-based features (to protect the privacy of each organization's enterprise application data). Moreover, in various embodiments, the inductive multi-organization recommendation model includes a logistic regression model, a GCN model, or an IGMC model, or some combination thereof. However, those skilled in the art will appreciate that any other suitable type of neural-network-based recommendation model may be utilized, depending on the details of the particular implementation.

At block 214, the trained inductive multi-organization recommendation model is used to provide, via the network, user recommendations to the remote organization computing systems during execution of the enterprise application. Such user recommendations may relate to one or more tasks associated with the enterprise application. As an example, if the enterprise application includes a search feature, the user recommendations may include ranked lists of search results that are likely to be of interest to the user. As another example, if the enterprise application includes collaborative/communication features, the user recommendations may include suggested contacts for the user and/or suggested posts that are likely to be of interest to the user. Those skilled in the art will appreciate that various different types of user recommendations may be generated using the inductive multi-organization recommendation model, depending on the type of enterprise application being utilized by the user as well as the manner in which the user is utilizing such enterprise application.

The block diagram of FIG. 2 is not intended to indicate that the blocks of the method 200 are to be executed in any particular order, or that all of the blocks 202-214 of the method 200 are to be included in every case. Moreover, any number of additional blocks may be included within the method 200, depending on the details of the specific implementation. For example, in some embodiments, the method 200 also includes periodically updating the inductive multi-organization recommendation model as new enterprise application data are received from the specified number of organizations corresponding to the best-transferring per-organization recommendation models (e.g., from the k organizations with the top-k best-transferring per-organization recommendation models). According to embodiments described herein, such periodic model updating is enabled by the fact that the inductive multi-organization recommendation model is trained using enterprise application data from a subset of the organizations executing the enterprise application. In particular, training based on a subset of the organizations enables dynamic feedback to be easily analyzed and used to update the model. In contrast, if enterprise application data from every organization executing the enterprise application was used to train the model, it would likely be too computationally-difficult and expensive to update the model on a regular basis.

Figure 3:
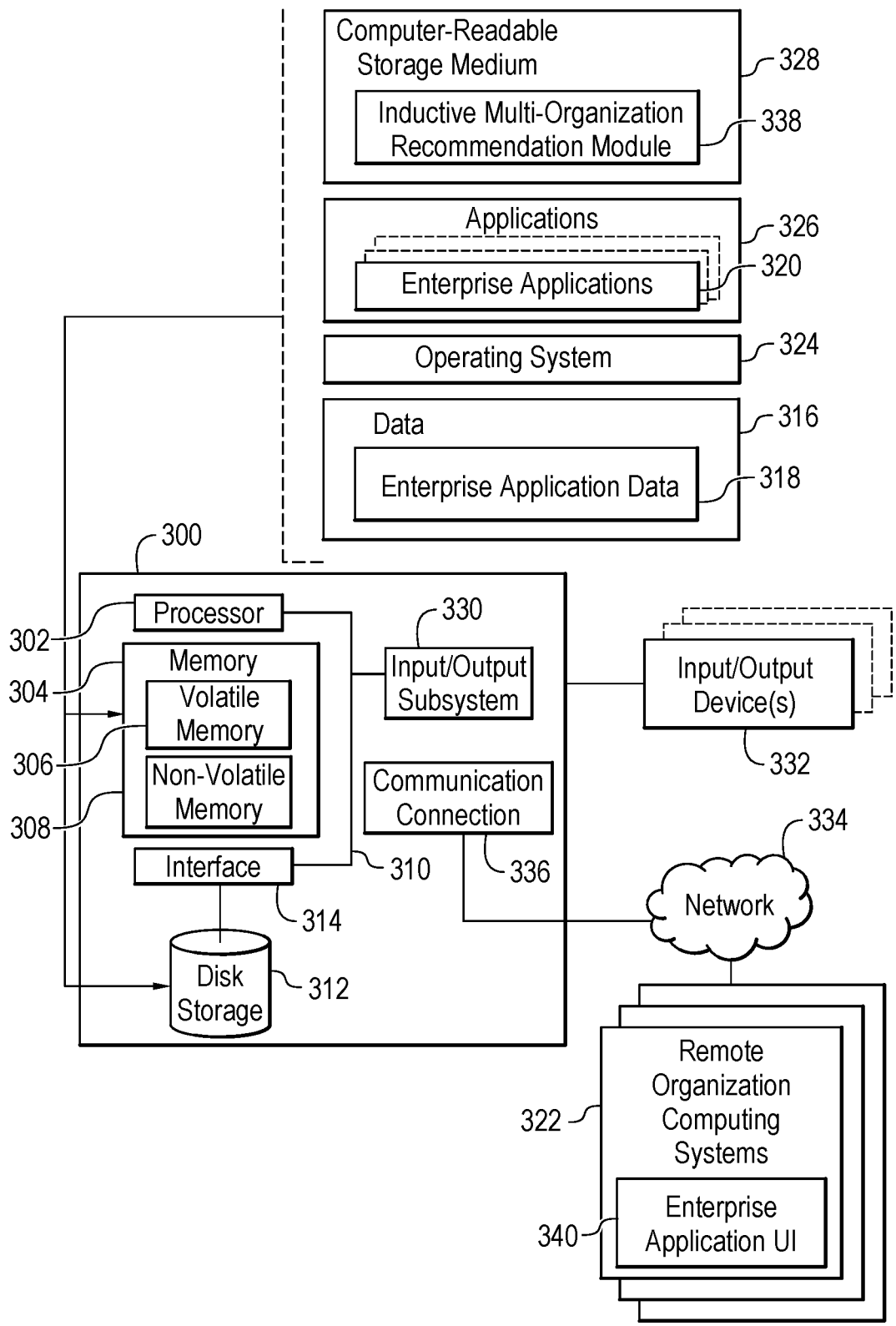
FIG. 3 is a block diagram of an exemplary computing system for implementing the inductive multi-organization recommendation techniques described herein.

Exemplary Computing System and Network Environment for Implementing Inductive Multi-Organization Recommendation Techniques Described Herein FIG. 3 is a block diagram of an exemplary computing system 300 for implementing the inductive multi-organization recommendation techniques described herein. The exemplary computing system 300 includes a processor 302 and a memory 304. The processor 302 may include any suitable type of processing unit or device, such as, for example, a single-core processor, a multi-core processor, a computing cluster, or any number of other configurations. Moreover, the processor 302 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 304 typically (but not always) includes both volatile memory 306 and non-volatile memory 308. The volatile memory 306 retains or stores information so long as the memory is supplied with power. By contrast, the non-volatile memory 308 is capable of storing (or persisting) information even when a power supply is not available. The volatile memory 306 may include, for example, RAM (e.g., synchronous RAM (SRAM), dynamic RAM (DRAM), synchronous dynamic RAM (SDRAM), and the like) and CPU cache memory. The nonvolatile memory 308 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 302 and the memory 304, as well as other components of the computing system 300, are interconnected by way of a system bus 310. The system bus 310 can be implemented using any suitable bus architecture known to those skilled in the art.

According to the embodiment shown in FIG. 3, the computing system 300 also includes a disk storage 312. The disk storage 312 may include any suitable removable/non-removable, volatile/non-volatile storage component or device. For example, the disk storage 312 may include, but is not limited to, a magnetic disk drive, floppy disk drive, tape drive, Jaz drive, Zip drive, LS-210 drive, flash memory card, memory stick, or the like. In addition, the disk storage 312 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 312 to the system bus 310, a removable or non-removable interface is typically used, such as interface 314 shown in FIG. 3.

In various embodiments, the disk storage 312 and/or the memory 304 function as one or more databases that are used to store data 316 relating to the techniques described herein. Such data 316 include, but are not limited to, enterprise application data 318 obtained from execution of one or more web-based enterprise application(s) 320 on various remote organization computing systems 322, where such remote organization computing systems 322 are operated by users who are associated with organizations that subscribe to the enterprise application(s) 320.

Those skilled in the art will appreciate that FIG. 3 describes software that acts as an intermediary between a user of the computing system 300 and the basic computing resources described with respect to the operating environment of the computing system 300. Such software includes an operating system 324. The operating system 324, which may be stored on the disk storage 312, acts to control and allocate the computing resources of the computing system 300. Moreover, system applications 326, including the enterprise application(s) 320, take advantage of the management of the computing resources by the operating system 324 through one or more program modules stored within a computer-readable storage medium (or media) 328, as described further herein.

The computing system 300 also includes an input/output (I/O) subsystem 330. The I/O subsystem 330 includes a set of hardware, software, and/or firmware components that enable or facilitate inter-communication between the user of the computing system 300 and the processor 302 of the computing system 300. During operation of the computing system 300, the I/O subsystem 330 enables the user to interact with the computing system 300 through various input/output (I/O) devices 332. Such I/O devices 332 may include any number of input devices or channels, such as, for example, one or more touchscreen/haptic input devices, one or more buttons, one or more pointing devices, one or more accessories, one or more audio input devices, and/or one or more video input devices, such as a camera. As an example, in some embodiments, such input devices or channels include one or more Natural User Interface (NUI) devices, where the term "Natural User Interface (NUI)" refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch-sensitive displays, voice and speech recognition, intention and goal understanding, and motion gesture detection using depth cameras such as stereoscopic camera systems, infrared camera systems, RGB camera systems, and combinations of these. NUI devices can also include motion gesture detection using accelerometers or gyroscopes, facial recognition, three-dimensional (3D) displays, head, eye, and gaze tracking, immersive augmented-reality and virtual-reality systems, all of which provide a more natural interface. Furthermore, in some embodiments the one or more input devices or channels connect to the processor 302 through the system bus 310 via one or more interface ports (not shown) integrated within the I/O subsystem 330. Such interface ports may include, for example, a serial port, a parallel port, a game port, and/or a universal serial bus (USB).

In addition, such I/O devices 332 may include any number of output devices or channels, such as, for example, one or more audio output devices, one or more haptic feedback devices, and/or one or more display devices. Such output devices or channels may use some of the same types of ports as the input devices or channels. Thus, for example, a USB port may be used to both provide input to the computing system 300 and to output information from the computing system 300 to a corresponding output device. Moreover, in some embodiments, the one or more output devices or channels are accessible via one or more adapters (not shown) integrated within the I/O subsystem 330.

In various embodiments, the computing system 300 is communicably coupled to the remote organization computing systems 322, which may include, for example, computing systems configured with web browsers, PC applications, mobile phone applications, and the like, that are utilized by users associated with particular organizations that subscribe to the enterprise application(s) 320. In addition, the remote organization computing systems 322 may include, for example, one or more personal computers, one or more servers, one or more routers, one or more network PCs, one or more workstations, one or more microprocessor-based appliances, one or more mobile phones, and/or one or more peer devices or other common network nodes. Moreover, in various embodiments, the computing system 300 is an enterprise system server hosting the enterprise application(s) 320 in a networked environment using logical connections to the remote organization computing systems 322, as described further with respect to FIG. 4. In such embodiments, the computing system 300 may provide for execution of the web-based enterprise application(s) 320 on the remote organization computing systems 322 with the enhanced functionality provided by the inductive multi-organization recommendation techniques described herein.

In various embodiments, the remote organization computing systems 322 are logically connected to the computing system 300 through a network 334 and then connected via a communication connection 336, which may be wireless. The network 334 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 336 includes the hardware/software employed to connect the network 334 to the bus 310. While the communication connection 336 is shown for illustrative clarity as residing inside the computing system 300, it can also be external to the computing system 300. The hardware/software for connection to the network 334 may include, for example, internal and external technologies, such as mobile phone switches, modems including regular telephone grade modems, cable modems and DSL modems, ISDN adapters, and/or Ethernet cards.

As described above, system applications 326, such as the enterprise application(s) 320 described herein, take advantage of the management of the computing resources by the operating system 324 through one or more program modules stored within the computer-readable storage medium (or media) 328. In some embodiments, the computer-readable storage medium 328 is integral to the computing system 300, in which case it may form part of the memory 304 and/or the disk storage 312. In other embodiments, the computer-readable storage medium 328 is an external device that is connected to the computing system 300 when in use.

In various embodiments, the one or more program modules stored within the computer-readable storage medium 328 include program instructions or code that may be executed by the processor 302 to perform various operations, including the inductive multi-organization recommendation techniques described herein. In various embodiments, such program modules include, but are not limited to, an inductive multi-organization recommendation module 338 that causes the processor 302 to perform operations that result in the execution of the techniques described herein for the targeted training of inductive multi-organization recommendation models for enterprise applications, as described with respect to the method 200 of FIG. 2, for example.

Furthermore, in various embodiments, execution of the enterprise application(s) 320 in conjunction with the inductive multi-organization recommendation module 338 results in the generation of user recommendations during execution of the enterprise application(s) 320 on the remote organization computing systems 322. In various embodiments, such user recommendations are provided to the corresponding remote organization computing system 322 via the network 334 and are surfaced on the display of the corresponding remote organization computing system 322 as part of the enterprise application user interface (UI) 340, as described further with respect to FIG. 4.

It is to be understood that the block diagram of FIG. 3 is not intended to indicate that the computing system 300 is to include all of the components shown in FIG. 3. Rather, the computing system 300 can include fewer or additional components not illustrated in FIG. 3 (e.g., additional applications, additional modules, additional memory devices, additional network interfaces, etc.). Furthermore, any of the functionalities of the one or more program modules/submodules may be partially, or entirely, implemented in hardware and/or in the processor 302. For example, the functionality may be implemented with an application specific integrated circuit, in logic implemented in the processor 302, or in any other device.

Figure 4:
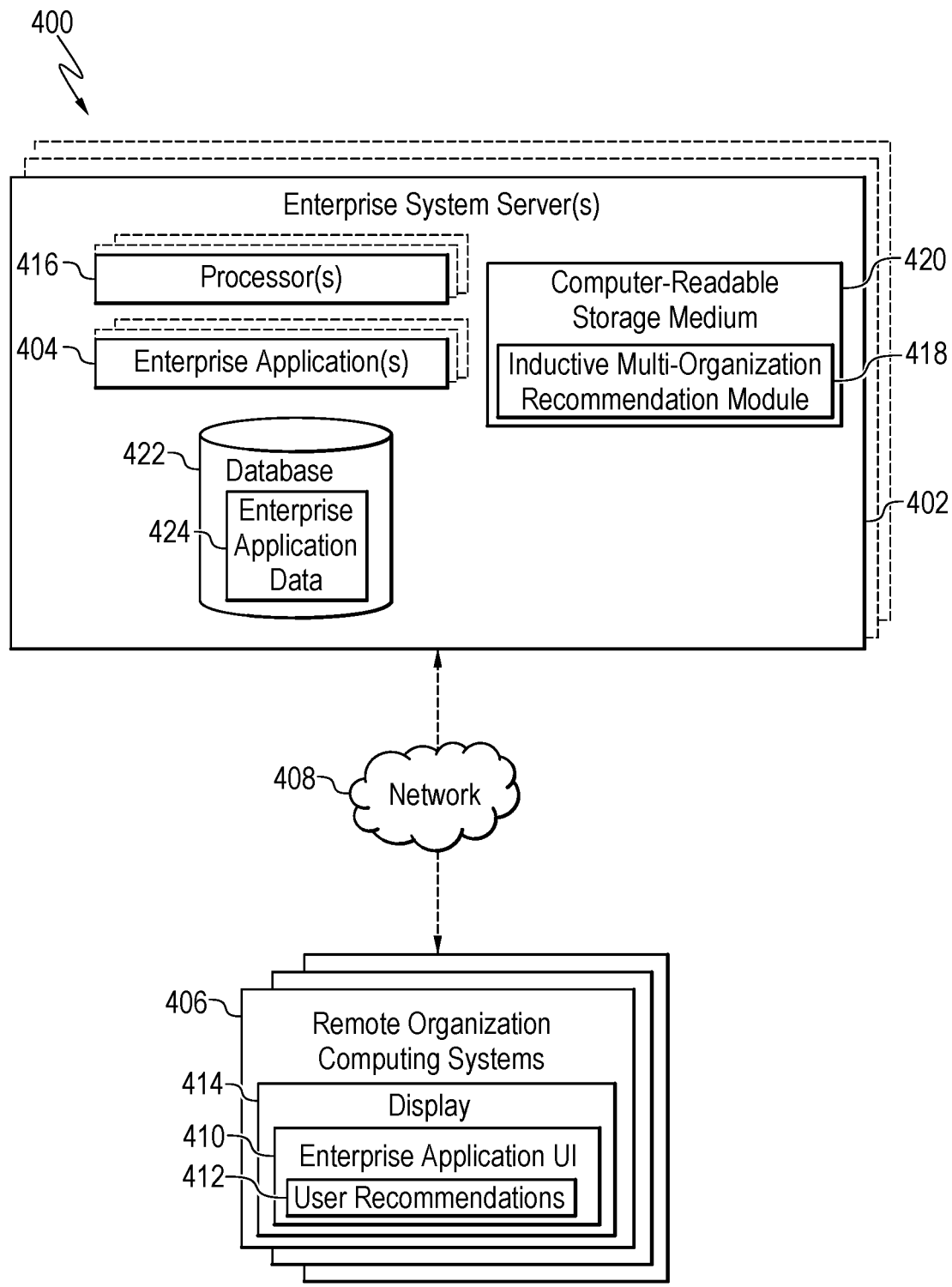
FIG. 4 is a block diagram of an exemplary network environment for implementing the inductive multi-organization recommendation techniques described herein.

FIG. 4 is a block diagram of an exemplary network environment 400 for implementing the inductive multi-organization recommendation techniques described herein. As shown in FIG. 4, the network environment 400 includes one or more enterprise system server(s) 402 that provide for the execution of one or more enterprise application(s) 404 including inductive multi-organization recommendation functionalities on remote organization computing systems 406. Such remote organization computing systems may include any suitable types of computing systems operated by users associated with organizations that subscribe to the enterprise application(s) 404. As examples, such organizations may include those relating to large industries, governments, retailers, hospitals, and/or departments/organizations directed to sales, marketing, customer service, project management, financing, and the like. Moreover, the inductive multi-organization recommendation functionalities may be provided to the remote organization computing systems 406 via a network 408, which provides a communications link for facilitating the transfer of electronic content between the enterprise system server(s) 402 and the remote organization computing systems 406. The network 408 may include, but is not limited to, a cellular network, a point-to-point dial up connection, a satellite network, the Internet, a local area network (LAN), a wide area network (WAN), and/or a Wi-Fi network. Such networks are widely used to connect various types of network elements, such as routers, servers, and gateways. Moreover, those skilled in the art will appreciate that the present techniques may also be practiced in a multi-network environment having various connected public and/or private networks. Furthermore, those skilled in the art will appreciate that communication networks can take several different forms and use several different communication protocols. For example, in some embodiments, the present techniques may be practiced in a distributed computing environment in which tasks are performed by remote processing devices that are linked through a communications network. In a distributed computing environment, program modules can be located in both local and remote computer-readable storage media.

In various embodiments, each remote organization computing system 406 includes one or more processors, one or more memory devices, and one or more disk storage devices, and as well as an input/output subsystem that operatively couples one or more input/output devices to the processor(s). Moreover, each remote organization computing system 406 may include any suitable type of computing device, including, but not limited to, a desktop computer, laptop computer, tablet, mobile phone, gaming system, television, or the like. Generally speaking, each remote organization computing system 406 may include any type of computing device that provides its user with the ability to load and execute software programs, including the enterprise application(s) 404, as well as the ability to access the network 408 to communicate with the enterprise system server(s) 402.

In various embodiments, each enterprise system server 402 hosts an enterprise application UI 410 including user recommendations 412 on a display 414 of any number of the remote organization computing systems 406. In various embodiments, this is accomplished by executing, via one or more processors 416 of the corresponding enterprise system server 402, the enterprise application 404 in conjunction with an inductive multi-organization recommendation module 418 stored within a computer-readable storage medium 420 of the enterprise system server 402, as described further with respect to FIG. 5. In addition, each enterprise system server 402 may include a database 422 that functions as a repository for the data (including enterprise application data 424) used by the components of the enterprise system server 402 to enable execution of the enterprise application 404 on the remote organization computing systems 406.

It is to be understood that the block diagram of FIG. 4 is not intended to indicate that the network environment 400 is to include all of the components shown in FIG. 4. Rather, the network environment 400 can include fewer or additional components not illustrated in FIG. 4. For example, in practice, the enterprise system server(s) 402 and the remote organization computing systems 406 will include a number of additional components not depicted in the simplified block diagram of FIG. 4, as described with respect to the computing system 300 of FIG. 3, for example.

Figure 5:
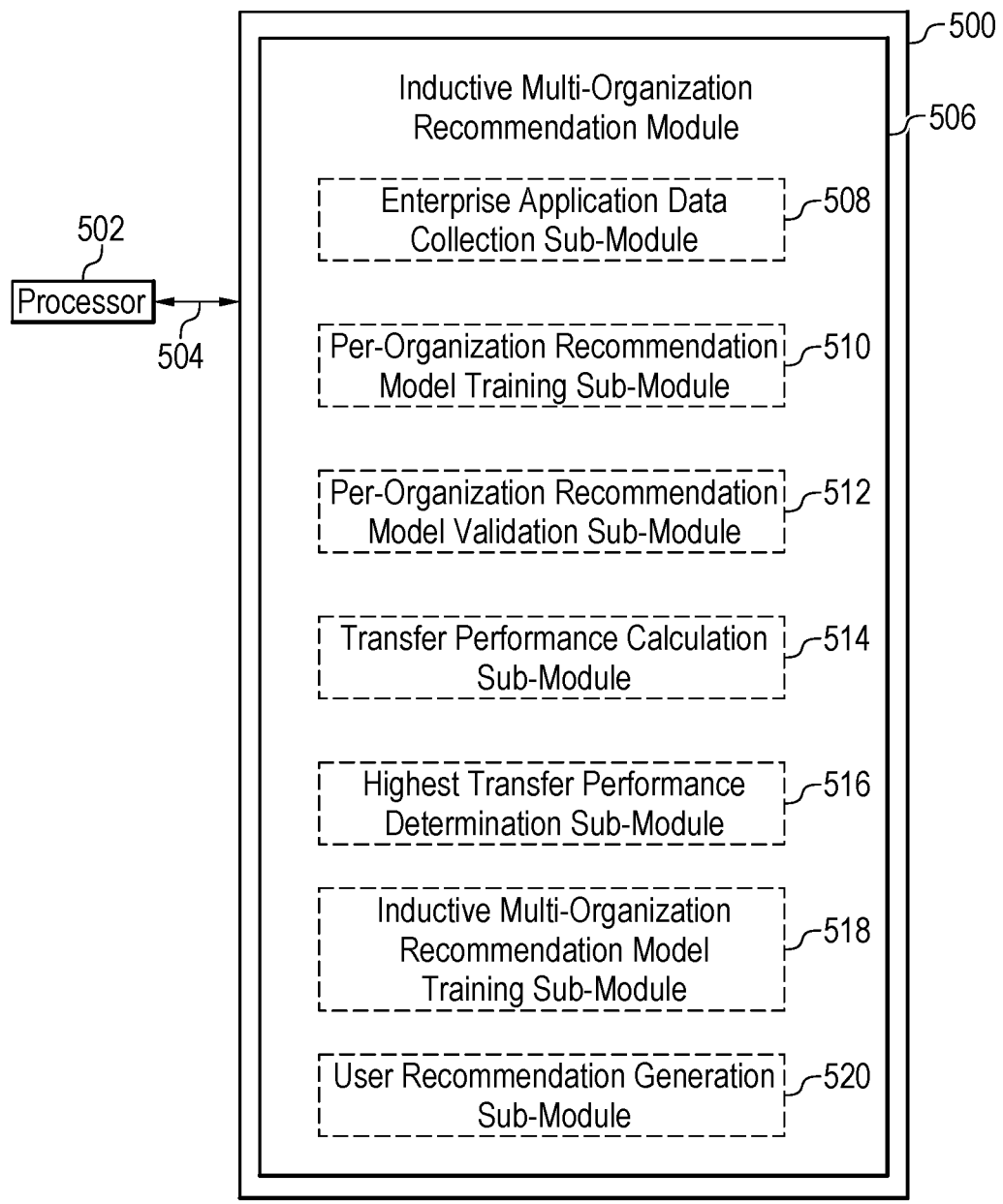
FIG. 5 is a block diagram of an exemplary computer-readable storage medium for implementing the inductive multi-organization recommendation techniques described herein.

FIG. 5 is a block diagram of an exemplary computer-readable storage medium 500 for implementing the inductive multi-organization recommendation techniques described herein. In various embodiments, the computer-readable storage medium 500 is accessed by a processor 502 over a computer interconnect 504. For example, in some embodiments, the computer-readable storage medium 500 is the same as, or similar to, the computer-readable storage medium described with respect to the computing system 300 of FIG. 3 and/or the network environment 400 of FIG. 4.

In various embodiments, the computer-readable storage medium 500 includes code (i.e., computer-executable instructions) to direct the processor 502 to perform the operations of the present techniques. Such code may be stored within the computer-readable storage medium 500 in the form of program modules, where each module includes a set of computer-executable instructions that, when executed by the processor 502, cause the processor 502 to perform a corresponding set of operations. In particular, in various embodiments, the computer-readable storage medium 500 includes an inductive multi-organization recommendation module 506 that directs the processor 502 to perform the techniques described herein (or any suitable variation thereof). Such techniques include, but are not limited to, the method 200 described with respect to FIG. 2.

Furthermore, in various embodiments, the inductive multi-organization recommendation module 506 accomplishes this via a number of sub-modules. Such sub-modules may include, but are not limited to, an enterprise application data collection sub-module 508 for receiving enterprise application data from remote organization computing systems executing the enterprise application, a per-organization recommendation model training sub-module 510 for training per-organization recommendation models for a subset of the organizations that subscribe to the enterprise application, and a per-organization recommendation model validation sub-module 512 for validating each per-organization recommendation model using enterprise application data corresponding to one or more other organizations (i.e., performing cross-organization validation). In addition, such sub-modules may include, but are not limited to, a transfer performance calculation sub-module 514 for calculating a transferability metric for each per-organization recommendation model based on results obtained during the validation process, a highest transfer performance determination sub-module 516 for determining a specified number of organizations including the best-transferring per-organization recommendation models (e.g., determining the top-k best-transferring per-organization recommendation models), an inductive multi-organization recommendation model training sub-module 518 for training an inductive multi-organization recommendation model using enterprise application data obtained from the specified number of organizations (e.g., from the organizations associated with the top-k best-transferring per-organization recommendation models), and a user recommendation generation sub-module 520 for utilizing the trained inductive multi-organization recommendation model to provide user recommendations to the remote organization computing systems during execution of the enterprise application.

Moreover, those skilled in the art will appreciate that any suitable number of the modules/sub-modules shown in FIG. 5 may be included within the computer-readable storage medium 500. Furthermore, any number of additional modules/sub-modules not shown in FIG. 5 may be included within the computer-readable storage medium 500, depending on the details of the specific implementation.

Exemplary Implementations of Inductive Multi-Organization Recommendation Techniques Described Herein The following is a description of several exemplary implementations of the inductive multi-organization recommendation techniques described herein for particular use-case scenarios. Those skilled in the art will appreciate that these exemplary implementations are for illustrative purposes only. In practice, the inductive multi-organization recommendation techniques described herein may be implemented in any other suitable manner to achieve any other suitable results, depending on the details of the particular implementation.

The exemplary implementations described herein involved using several real-world datasets to compare per-organization model training, cluster model training, and global model training to the targeted model training provided by the inductive multi-organization recommendation techniques described herein. In particular, these methods were compared using two public datasets: coauthorships in 522 different computer science venues extracted from DBLP and question answers in 346 Stack Exchange communities. The methods were also compared using two anonymized telemetry datasets collected on Microsoft Teams and SharePoint, one with a user-user (or chat-coaccess) recommendation task (including 855 organizations) and one with a user-post (or message-action) recommendation task (including 426 organizations). Given the privacy requirements, only network topology and temporal features are used according to the present techniques. Moreover, three different types of models were used to evaluate the methods. Such models included a logistic regression model with dataset-specific instance features, a GCN model, and an IGMC model.

Based on these exemplary implementations, it was found that overall recommendation performance benefits significantly from the targeted model training provided by the inductive multi-organization recommendation techniques described herein. More specifically, more accurate recommendation models are generated via targeted training on a subset of organizations, selected by performing an initial round of per-organization recommendation model training and identifying the organizations whose recommendation models generalize best on one or more validation datasets. As a result, it has been observed that high generalization performance of a per-organization recommendation model indicates the suitability of the organization's data for final multi-organization recommendation model training. On the two large-scale Microsoft datasets, top-5 targeted training (meaning that data from the organizations with the top-5 best-transferring per-organization recommendation models were used for targeted training of the final inductive multi-organization recommendation model) outperforms per-organization recommendation models by 6.3%-28.7%, outperforms global recommendation models by 0.6%-12.6%, and outperforms clustering recommendation models by 0.2%-8.9% on a held-out test set (in average MAP across all organizations and across the three types of models). On the public Stack Exchange data, it was observed that excluding organizations from training can dramatically improve robustness over global model training. In particular, while it does not benefit the mean MAP for a simple logistic regression baseline, targeted training does improve mean MAP by 84% for a more noise-sensitive GCN approach.

It should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (SoC's), codecs, specially designed processors and/or logic circuits, and the like, on a computing system.

As suggested above, each method or process described herein is typically embodied within computer-executable instruction (or code) modules including individual routines, functions, looping structures, selectors and switches (such as if-then and if-then-else statements), assignments, arithmetic computations, and the like, that, in execution, configure a computing system to operate in accordance with the particular method or process However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

Examples

Example 1 is a method for targeted training of an inductive multi-organization recommendation model for an enterprise application, where the method is implemented in a computing system including a processor. The method includes: receiving, via a network, enterprise application data from remote organization computing systems executing the enterprise application, where each remote organization computing system corresponds to an organization that subscribes to the enterprise application; training, via the processor, a per-organization recommendation model for each of a subset of the organizations that subscribe to the enterprise application using at least a portion of the enterprise application data received from the corresponding remote organization computing systems; validating each per-organization recommendation model on at least a portion of the enterprise application data corresponding to at least one other organization; calculating a transferability metric for each per-organization recommendation model based on results obtained during the validation of the per-organization recommendation model; determining a specified number of organizations including the best-transferring per-organization recommendation models based on the calculated transferability metrics; training an inductive multi-organization recommendation model using at least a portion of the enterprise application data from the specified number of organizations including the best-transferring per-organization recommendation models; and utilizing the trained inductive multi-organization recommendation model to provide, via the network, user recommendations to the remote organization computing systems during execution of the enterprise application.

Example 2 includes the method of example 1, including or excluding optional features. In this example, the method includes training the per-organization recommendation models and the inductive multi-organization recommendation model using at least one of network topology features or temporal features but excluding content-based features.

Example 3 includes the method of example 1 or 2, including or excluding optional features. In this example, the method includes periodically updating the inductive multi-organization recommendation model as new enterprise application data are received from the specified number of organizations including the best-transferring per-organization recommendation models.

Example 4 includes the method of any one of examples 1 to 3, including or excluding optional features. In this example, the transferability metric includes a ranking metric.

Example 5 includes the method of example 4, including or excluding optional features. In this example, the ranking metric includes a mean average precision (MAP) for the results obtained during the validation of each per-organization recommendation model.

Example 6 includes the method of any one of examples 1 to 5, including or excluding optional features. In this example, the per-organization recommendation models and the inductive multi-organization recommendation model include at least one of a logistic regression model, a graph convolutional network (GCN) model, or an inductive graph-based matrix completion (IGMC) model.

Example 7 includes the method of any one of examples 1 to 6, including or excluding optional features. In this example, training the inductive multi-organization recommendation model using at least the portion of the enterprise application data from the specified number of organizations includes disregarding the best-transferring per-organization recommendation models and training the inductive multi-organization recommendation model using only at least the portion of the enterprise application data from the specified number of organizations including the best-transferring per-organization recommendation models.

Example 8 includes the method of any one of examples 1 to 6, including or excluding optional features. In this example, training the inductive multi-organization recommendation model using at least the portion of the enterprise application data from the specified number of organizations includes aggregating the best-transferring per-organization recommendation models.

Example 9 includes the method of any one of examples 1 to 8, including or excluding optional features. In this example, the enterprise application includes a communication/collaboration application, and where the enterprise application data include at least one of user-user data or user-item data.

Example 10 is a computer-readable storage medium including computer-executable instructions that, when executed by a processor, cause the processor to: receive enterprise application data from remote organization computing systems executing the enterprise application, where each remote organization computing system corresponds to an organization that subscribes to the enterprise application; train a per-organization recommendation model for each of a subset of the organizations that subscribe to the enterprise application using at least a portion of the enterprise application data received from the corresponding remote organization computing systems; validate each per-organization recommendation model on at least a portion of the enterprise application data corresponding to at least one other organization; calculate a transferability metric for each per-organization recommendation model based on results obtained during the validation of the per-organization recommendation model; determine a specified number of organizations including the best-transferring per-organization recommendation models based on the calculated transferability metrics; train an inductive multi-organization recommendation model using at least a portion of the enterprise application data from the specified number of organizations including the best-transferring per-organization recommendation models; and utilize the trained inductive multi-organization recommendation model to provide, via the network, user recommendations to the remote organization computing systems during execution of the enterprise application.

Example 11 includes the computer-readable storage medium of example 10, including or excluding optional features. In this example, the computer-executable instructions, when executed by the processor, cause the processor to train the per-organization recommendation models and the inductive multi-organization recommendation model using at least one of network topology features or temporal features, but excluding content-based features.

Example 12 includes the computer-readable storage medium of example 10 or 11, including or excluding optional features. In this example, the computer-executable instructions, when executed by the processor, cause the processor to periodically update the inductive multi-organization recommendation model as new enterprise application data are received from the specified number of organizations including the best-transferring per-organization recommendation models.

Example 13 is the computer-readable storage medium of any one of examples 10 to 12, including or excluding optional features. In this example, the computer-executable instructions, when executed by the processor, cause the processor to calculate the transferability metric for each per-organization recommendation model by calculating a mean average precision (MAP) for the results obtained during the validation of the per-organization recommendation model.

Example 14 includes the computer-readable storage medium of any one of examples 10 to 13, including or excluding optional features. In this example, the per-organization recommendation models and the inductive multi-organization recommendation model include at least one of a logistic regression model, a GCN model, or an IGMC model.

Example 15 includes the computer-readable storage medium of any one of examples 10 to 14, including or excluding optional features. In this example, the computer-executable instructions, when executed by the processor, cause the processor to train the inductive multi-organization recommendation model using at least the portion of the enterprise application data from the specified number of organizations by disregarding the best-transferring per-organization recommendation models and training the inductive multi-organization recommendation model using only at least the portion of the enterprise application data from the specified number of organizations including the best-transferring per-organization recommendation models.

Example 16 includes the computer-readable storage medium of any one of examples 10 to 14, including or excluding optional features. In this example, the computer-executable instructions, when executed by the processor, cause the processor to train the inductive multi-organization recommendation model using at least the portion of the enterprise application data from the specified number of organizations by aggregating the best-transferring per-organization recommendation models.

Example 17 is an enterprise system server. The enterprise system server, includes a processor; an enterprise application; a communication connection for connecting remote organization computing systems to the enterprise system server through a network, where each remote organization computing system corresponds to an organization that subscribes to the enterprise application; a database for storing enterprise application data received from the remote organization computing systems during execution of the enterprise application; and a computer-readable storage medium operatively coupled to the processor, the computer-readable storage medium including computer-executable instructions that, when executed by the processor, cause the processor to: train a per-organization recommendation model for each of a subset of the organizations that subscribe to the enterprise application using at least a portion of the enterprise application data received from the corresponding remote organization computing systems; validate each per-organization recommendation model on at least a portion of the enterprise application data corresponding to at least one other organization; calculate a transferability metric for each per-organization recommendation model based on results obtained during the validation of the per-organization recommendation model; determine a specified number of organizations including the best-transferring per-organization recommendation models based on the calculated transferability metric; train an inductive multi-organization recommendation model using at least a portion of the enterprise application data from the specified number of organizations including the best-transferring per-organization recommendation models; and utilize the trained inductive multi-organization recommendation model to provide, via the network, user recommendations to the remote organization computing systems during execution of the enterprise application.

Example 18 includes the enterprise system server of example 17, including or excluding optional features. In this example, the computer-readable storage medium includes computer-executable instructions that, when executed by the processor, cause the processor to train the per-organization recommendation models and the inductive multi-organization recommendation model using at least one of network topology features or temporal features, but excluding content-based features.

Example 19 includes the enterprise system server of example 17 or 18, including or excluding optional features. In this example, the computer-readable storage medium includes computer-executable instructions that, when executed by the processor, cause the processor to periodically update the inductive multi-organization recommendation model as new enterprise application data are received from the specified number of organizations including the best-transferring per-organization recommendation models.

Example 20 includes the enterprise system server of any one of examples 17 to 19, including or excluding optional features. In this example, the computer-readable storage medium includes computer-executable instructions that, when executed by the processor, cause the processor to train the inductive multi-organization recommendation model using at least the portion of the enterprise application data from the specified number of organizations by disregarding the best-transferring per-organization recommendation models and training the inductive multi-organization recommendation model using only at least the portion of the enterprise application data from the specified number of organizations including the best-transferring per-organization recommendation models.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method implemented in a computing system comprising a processor, and wherein the method comprises:
receiving, via a network, enterprise application data from remote organization computing systems executing an enterprise application, wherein each remote organization computing system corresponds to an organization that subscribes to the enterprise application;
training, via the processor, a per-organization recommendation machine learning model for each of a subset of the organizations that subscribe to the enterprise application using at least a portion of the enterprise application data received from the corresponding remote organization computing systems;
validating each per-organization recommendation machine learning model on at least a portion of the enterprise application data corresponding to at least one other organization;
calculating a transferability metric for each per-organization recommendation machine learning model based on results obtained during the validation of the per-organization recommendation machine learning model, wherein the calculated transferability metric includes a mean average precision (MAP) for the results obtained during the validation of each per-organization recommendation machine learning model;
determining a specified number of organizations comprising best-transferring per-organization recommendation machine learning models based on the calculated transferability metrics;
training an inductive multi-organization recommendation machine learning model using at least a portion of the enterprise application data from the specified number of organizations comprising the best-transferring per-organization recommendation machine learning models;
transmitting, via the network, user recommendations to the remote organization computing systems during execution of the enterprise application, the user recommendations being derived based on the trained inductive multi-organization recommendation machine learning model; and receiving new enterprise application data from at least one of the remote organization computing systems, wherein the new enterprise application data is used to update the inductive multi-organization recommendation machine learning model.

2. The method of claim 1, further comprising training the per-organization recommendation machine learning models and the inductive multi-organization recommendation machine learning model using at least one of network topology features or temporal features, but excluding content-based features.

3. The method of claim 1, further comprising periodically updating the inductive multi-organization recommendation machine learning model as new enterprise application data are received from the specified number of organizations comprising the best-transferring per-organization recommendation machine learning models.

4. The method of claim 1, wherein the transferability metric comprises a ranking metric.

5. The method of claim 1, wherein the per-organization recommendation machine learning models and the inductive multi-organization recommendation machine learning model comprise at least one of a logistic regression model, a graph convolutional network (GCN) model, or an inductive graph-based matrix completion (IGMC) model.

6. The method of claim 1, wherein training the inductive multi-organization recommendation machine learning model using at least the portion of the enterprise application data from the specified number of organizations comprises:
disregarding the best-transferring per-organization recommendation machine learning models; and
training the inductive multi-organization recommendation machine learning model using only at least the portion of the enterprise application data from the specified number of organizations comprising the best-transferring per-organization recommendation machine learning models.

7. The method of claim 1, wherein training the inductive multi-organization recommendation machine learning model using at least the portion of the enterprise application data from the specified number of organizations comprises aggregating the best-transferring per-organization recommendation machine learning models.

8. The method of claim 1, wherein the enterprise application comprises a communication/collaboration application, and wherein the enterprise application data comprise at least one of user-user data or user-item data.

9. The method of claim 1, wherein the new enterprise application data is used to iteratively update the inductive multi-organization recommendation machine learning model.

10. The method of claim 1, wherein the new enterprise application data is used to periodically or aperiodically update the inductive multi-organization recommendation machine learning model.

11. A computer-readable storage medium comprising computer-executable instructions that, when executed by a processor, cause the processor to:
receive, via a network, enterprise application data from remote organization computing systems executing an enterprise application, wherein each remote organization computing system corresponds to an organization that subscribes to an enterprise application;
train a per-organization recommendation machine learning model for each of a subset of the organizations that subscribe to the enterprise application using at least a portion of the enterprise application data received from the corresponding remote organization computing systems;
validate each per-organization recommendation machine learning model on at least a portion of the enterprise application data corresponding to at least one other organization;
calculate a transferability metric for each per-organization recommendation machine learning model based on results obtained during the validation of the per-organization recommendation machine learning model, wherein the calculated transferability metric includes a mean average precision (MAP) for the results obtained during the validation of each per-organization recommendation machine learning model;
determine a specified number of organizations comprising best-transferring per-organization recommendation machine learning models based on the calculated transferability metrics;
train an inductive multi-organization recommendation machine learning model using at least a portion of the enterprise application data from the specified number of organizations comprising the best-transferring per-organization recommendation machine learning models;
transmitting, via the network, user recommendations to the remote organization computing systems during execution of the enterprise application, the user recommendations being derived based on the trained inductive multi-organization recommendation machine learning model; and
receive new enterprise application data from at least one of the remote organization computing systems, wherein the new enterprise application data is used to update the inductive multi-organization recommendation machine learning model.

12. The computer-readable storage medium of claim 11, wherein the computer-executable instructions further cause the processor to train the per-organization recommendation machine learning models and the inductive multi-organization recommendation machine learning model using at least one of network topology features or temporal features, but excluding content-based features.

13. The computer-readable storage medium of claim 11, wherein the computer-executable instructions further cause the processor to periodically update the inductive multi-organization recommendation machine learning model as new enterprise application data are received from the specified number of organizations comprising the best-transferring per-organization recommendation machine learning models.

14. The computer-readable storage medium of claim 11, wherein the transferability metric comprises a ranking metric.

15. The computer-readable storage medium of claim 11, wherein the per-organization recommendation machine learning models and the inductive multi-organization recommendation machine learning model comprise at least one of a logistic regression model, a graph convolutional network (GCN) model, or an inductive graph-based matrix completion (IGMC) model.

16. The computer-readable storage medium of claim 11, wherein the enterprise application comprises a communication/collaboration application, and wherein the enterprise application data comprise at least one of user-user data or user-item data.

17. The computer-readable storage medium of claim 11, wherein the new enterprise application data is used to iteratively update the inductive multi-organization recommendation machine learning model.

18. The computer-readable storage medium of claim 11, wherein the new enterprise application data is used to periodically or aperiodically update the inductive multi-organization recommendation machine learning model.

19. An enterprise system server, comprising:
  a processor;
  memory storing computer-executable instructions that, when executed by the processor, cause the processor to:
  receive, via a network, enterprise application data from remote organization computing systems executing an enterprise application, wherein each remote organization computing system corresponds to an organization that subscribes to an enterprise application;
  train a per-organization recommendation machine learning model for each of a subset of the organizations that subscribe to the enterprise application using at least a portion of the enterprise application data received from the corresponding remote organization computing systems;
  validate each per-organization recommendation machine learning model on at least a portion of the enterprise application data corresponding to at least one other organization;
  calculate a transferability metric for each per-organization recommendation machine learning model based on results obtained during the validation of the per-organization recommendation machine learning model, wherein the calculated transferability metric includes a mean average precision (MAP) for the results obtained during the validation of each per-organization recommendation machine learning model;
  determine a specified number of organizations comprising best-transferring per-organization recommendation machine learning models based on the calculated transferability metrics;
  train an inductive multi-organization recommendation machine learning model using at least a portion of the enterprise application data from the specified number of organizations comprising the best-transferring per-organization recommendation machine learning models;
  transmitting, via the network, user recommendations to the remote organization computing systems during execution of the enterprise application, the user recommendations being derived based on the trained inductive multi-organization recommendation machine learning model; and
  receive new enterprise application data from at least one of the remote organization computing systems, wherein the new enterprise application data is used to update the inductive multi-organization recommendation machine learning model.

20. The enterprise system server of claim 19, wherein the new enterprise application data is used to periodically or aperiodically update the inductive multi-organization recommendation machine learning model.

\* \* \* \* \*